United States Patent
Whipple

[15] 3,675,444
[45] July 11, 1972

[54] HIGH SPEED SHAFT DISCONNECT UTILIZING A FUSIBLE ELEMENT

[72] Inventor: Edward R. Whipple, Erie, Pa.
[73] Assignee: General Electric Company
[22] Filed: Nov. 3, 1970
[21] Appl. No.: 86,430

[52] U.S. Cl. .................................................. 64/28 R
[51] Int. Cl. ............................................... F16d 9/00
[58] Field of Search ................................... 64/13, 28 R

[56] References Cited

UNITED STATES PATENTS

| | | | |
|---|---|---|---|
| 2,727,371 | 12/1955 | Troeger et al. | 64/28 |
| 3,237,741 | 3/1966 | Potter et al. | 64/28 X |
| 3,427,826 | 2/1969 | Anderson | 64/28 X |

Primary Examiner—Kenneth W. Sprague
Attorney—I. David Blumenfeld, Frank L. Neuhauser, Oscar B. Waddell and Joseph B. Forman

[57] ABSTRACT

A disconnect arrangement for high speed generators such as those utilized in aircraft electrical systems includes a spring loaded face clutch which has the individual clutch members coupled to the driving and driven shafts. A fusible, low temperature element is positioned between one of the shafts and one of the clutch members to force the clutch members into engagement against the spring force. A friction arm is actuated in response to any one of a number of malfunctions to bring it into contact with a heat conducting member which bears against the fusible element. The heat generated by the friction between the arm and the member melts the disc allowing the spring to separate the clutch members and thereby disconnecting the generator shaft from the driving source.

8 Claims, 2 Drawing Figures

INVENTOR
EDWARD R. WHIPPLE
BY David Blumenfeld
ATTORNEY

HIGH SPEED SHAFT DISCONNECT UTILIZING A FUSIBLE ELEMENT

This invention relates to a disconnect device, and more particularly, to a device for disconnecting a driven device such as a generator from the driving source such as an aircraft engine, upon the occurrence of any malfunction in the mechanism.

In virtually all modern aircraft, the electrical system for supplying the electrical needs of the vehicle incorporates one or more generators which are either driven directly from the engine or through a speed reducing gearbox. In such aircraft applications, the generators are customarily operated at speeds which are often in excess of 10,000 rpm. At such high speeds, the occurrence of any one of a number of system malfunctions dictates that the generator be disconnected from the driving source as quickly as possible lest the generator be seriously damaged. Thus, for example, the generator should be disconnected from the driving source if there is an actual or incipient generator bearing failure, since the generator and other components of the system can be seriously damaged or destroyed if the generator is not disconnected from the driving source. Similarly, severe environmental conditions such as excessive vibration, engine overspeed, excessive oil temperature, etc. all require rapid disconnecting of the generator from the driving source. Usually, sensors of various types are strategically distributed throughout the aircraft to sense the occurrence or incipient occurrence of these undesirable and sometimes dangerous conditions. The sensors generate a signal which may either be utilized directly to actuate the disconnect device or may be used to produce indications such as the lighting of a warning light on the pilot's instrument panel with the pilot then actuating the disconnect mechanism.

Such disconnect devices are either resettable or non-resettable. Resettable disconnect devices, as the name implies, are devices of the type in which the generator, once disconnected, can be reconnected to the driving source without bringing it to a halt and without in any way disassembling the device or replacing components thereof. Resettable disconnects are utilized in many systems and in various ways to perform this function. However, in aircraft applications where the generators may be operated at speeds in excess of 10,000 rpm, the problems associated with resettable disconnect devices may be formidable. At these speeds, the problems of synchronization and proper alignment of the disconnected member to effect reconnection can be problems of major proportions and may result in a mechanism which is large, complex, weighty and cumbersome. Furthermore, the greater number of components required for the mechanism, particularly at the speeds described, the more severe the problem of reliability of the entire assembly. Consequently, in connection with high speed generators, the non-resettable type of disconnect is often preferred for its simplicity even though the device must be disassembled and reassembled to put it back into operation.

One form of non-resettable devices for disconnecting a generator from a driving source involves rupturing or shearing of one of the shafts, or of an element provided for this purpose between the driving and driven shaft. In many instances the shafts or element are also provided with properly dimensioned shear sections along which shearing or rupturing will take place preferentially. Non-resettable disconnect devices of the type which involve the rupturing, or shearing of a portion of one of the shafts, while effective to achieve the intended purpose, may also introduce some difficulties. Since the shearing of a metallic shaft or member is involved, the amount of energy which must be expended and absorbed in order to produce the shearing may be quite substantial, and, consequently, the disconnect may not take place as rapidly as may be desired. In addition, since shearing or rupturing of a metallic element is involved the possibility of metallic fragments being produced which are potentially hazardous to the rest of the equipment is always present. Furthermore, the ruptured or sheared shaft which must be replaced in order to reassemble the device and place it in operating condition again, may be a not insignificant cost item. Consequently, a need exists for a simple, lightweight, and effective non-resettable disconnect mechanism which is capable of operating at high speeds and which may be rapidly disconnected without the destruction of a substantial component in the system.

It is therefore, a primary objective of this invention to provide a non-resettable, shaft disconnect arrangement which is simple in construction, light in weight, which operates efficiently and effectively at high rotational speeds, and which may be reassembled after disconnect with a minimum of effort.

Another objective of the invention is to provide a non-resettable shaft disconnect arrangement, operable at high speeds in which the disconnect is operated by melting a fusible element.

Other objectives and advantages of the invention will become apparent as the description thereof proceeds.

The various advantages and objectives of the invention may be achieved by providing a non-resettable, disconnect mechanism in which the disconnect member, in the form of a spring loaded face clutch, is disposed between the driving and driven member. A fusible member is positioned between one of the shafts and one element of the clutch and exerts an axial force on the clutch which opposes the spring force tending to separate the clutch. Under normal operating condition, the clutch is engaged and torque is transmitted from the driving source to the driven member. Upon occurrence of a malfunction or an incipient malfunction, a friction arm or member is actuated to exert frictional force against a heat conducting element positioned adjacent to the fusible member. The heat thus generated, causes the fusible member to melt, releasing the axial force against the clutch so that the clutch elements are forced apart by the spring action thereby disconnecting the driving and driven member. Upon disassembly and reassembly of the disconnect, the fusible member is simply replaced, thereby simplifying the process of reconnecting the generator to the driving source.

The novel features, which are believed to be characteristic of this invention, are set forth with particularity in the appended claims. The invention itself, however, both to its organization and method of operation together with further objects and advantages thereof, may be best understood by reference to the following description taken in connection with the accompanying drawings in which:

Figure 1:
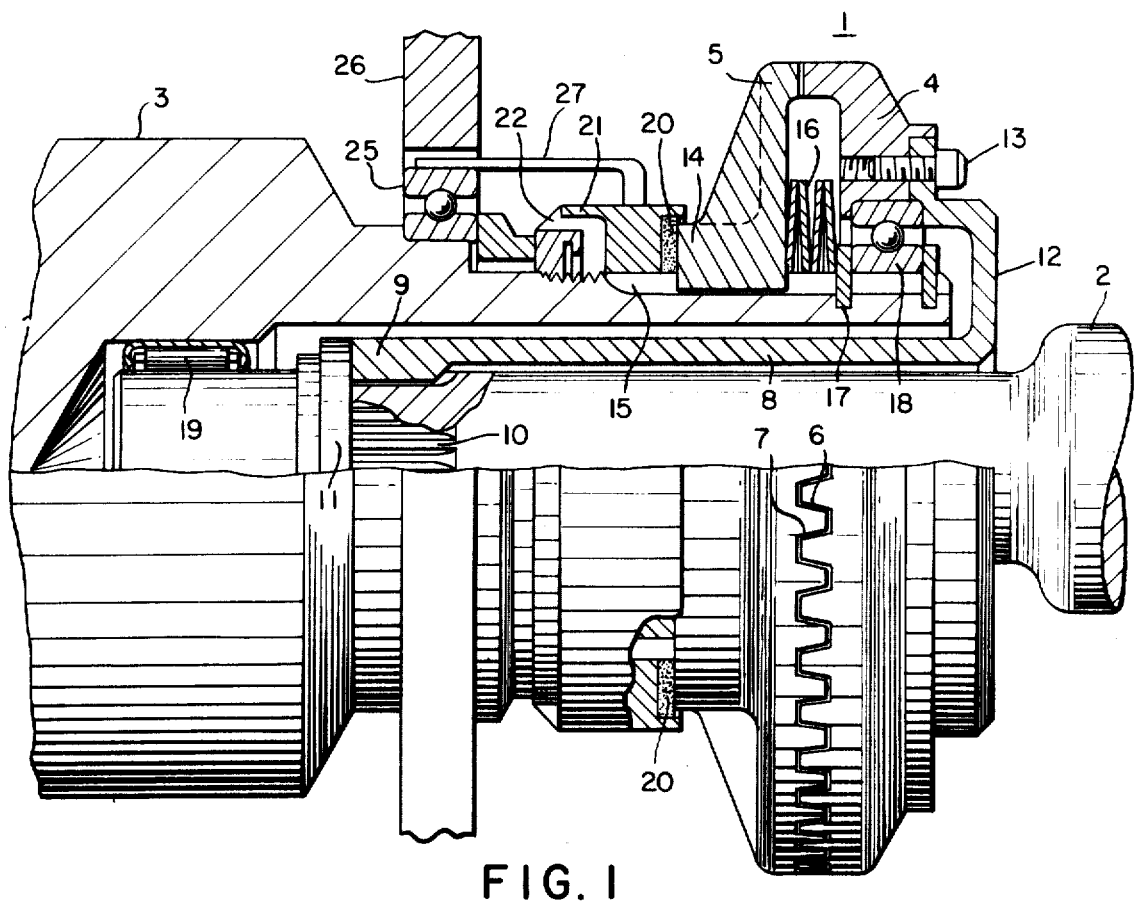
FIG. 1 is a vertical section taken through a disconnect device constructed in accordance with this invention.

One form of the high speed disconnect device of the instant invention is illustrated in FIG. 1 and takes the form of a spring loaded, axially movable, toothed assembly 1 coupled between a drive shaft 2 and a driven shaft 3. Disconnect device 1 takes the form of a face jaw clutch having two engageable clutch members 4 and 5 each of which has a plurality of angled teeth 6 and 7 around the outer periphery. Drive shaft 2 is connected to a source of motive power such as the engine of an aircraft, not shown, and is connected by means of a hollow coupling shaft 8 to jaw clutch member 4 to permit transmission of torque to shaft 3 when the clutch is engaged. Shaft 8 is coaxial to and extends partially into shaft 3 which is connected to a generator, not shown. One end of shaft 8 is splined internally and has a splined portion 9 which engages a corresponding splined portion 10 of shaft 2. A snap ring 11 fits over the two shafts to maintain the two shafts securely fastened. Coupling shaft 8 has a radial flange 12 to which clutch member 4 is attached by screws 13, thereby rigidly securing clutch member 4 to drive shaft 2. Clutch member 5, on the other hand, is secured to shaft 3 by an internally splined hub 14 which engages corresponding splines 15 on shaft 3. Thus, when the clutch is engaged, torque is transmitted from shaft 2 to shaft 3 through the clutch members.

The face jaw clutch 1 is spring loaded by means of a Belleville spring 16 positioned between clutch member 5 and one of a pair of C-rings 17 fastened to shaft 2. Spring 16 exerts an axial force tending to separate the clutch members and aids in separation of the clutch when the disconnect mechanism is operated.

Clutch member 4 is supported for rotation on the outer race of a ball bearing 18 which is positioned between C-rings 17. Drive shaft 2 is similarly journaled in the roller bearings disposed between drive shaft 2 and shaft 3. Whenever the clutch is disengaged, drive shaft 2, coupling shaft 8 and clutch member 4 are free to rotate as a unit about bearings 18 and 19.

The spring loaded clutch is controlled by a thermally actuated release element which normally forces the clutch members into engagement to transmit torque but which releases the clutch and disconnects the shaft in response to a malfunction in the system. To this end, a fusible disc 20 is positioned between clutch member 5 and a heat conductive bushing 21 which is maintained in heat exchange relationship with the fusible disc. A lock-nut 22 is threaded on shaft 3 clamping bushing 21 and disc 20 firmly against hub 14 of clutch member 5. This exerts axial force on the clutch to maintain it in engagement against the action of spring 16. Shaft 3 is also journaled in main generator bearing 25 which is secured in the generator housing shown generally at 26.

Positioned adjacent to bushing 21 and fusible disc 20 is a means for generating sufficient thermal energy in response to a malfunction to melt the fusible disc causing the clutch members 4 and 5 to move out of engagement under the influence of spring 16. Disengagement of the clutch and disconnection of the driving and driven shaft is achieved by providing a friction arm or member 27 which normally has a small running clearance relative to heat conducting bushing 21. Friction arm 27 is actuated in response to a malfunction to generate heat and melt fusible disc 20 positioned between the bushing and the clutch. In the embodiment of the invention illustrated in FIG. 1, the malfunction to be guarded against is a failure of main bearing 25 and consequently, friction arm 27 is fastened to the bearing housing by suitably attaching it to the outer race of the bearing. A bearing failure causes friction arm 27 to drop and come into frictional contact with bushing 21. Contact between arm 27 and bushing 21 generates heat which is transmitted through the bushing to the fusible disc causing the disc to melt. Melting of the disc results in the molten metal being thrown by centrifugal force outwardly through the clearance between bushing 21 and the hub of clutch member 5. Removal of the molten metal leaves an opening in bushing 21, allowing clutch member 5 to move axially to the left and disconnect the clutch.

Fusible disc 20 is fabricated of a metal which has a suitable melting point so that the disc melts quickly after the friction arm is brought into contact with bushing 21, while at the same time, its melting point is sufficiently high so that the fusible disc will not melt under normal operating temperatures. Thus, for example, a low temperature melting point metal such as tin, which has a melting point of 400° F., may be utilized for fabricating the fusible disc. It will be obvious, of course, that any other combination of metals or alloy having suitable melting points may be utilized in practicing the instant invention.

It will be noted that the face jaw clutch teeth are angled so that a force is exerted between the teeth by a cam action which, during torque transmission, tends to cause the teeth to ride upward along the incline to separate the teeth and the jaw faces. The angle of the teeth so chosen that this force tending to separate the clutch members equals or is slightly greater than the frictional force between the internal spline on hub 14 of the clutch member and splines 15 on the driven shaft. Thus, the separating force between the jaw members due to the inclined teeth will overcome the spline friction force when the disconnect is actuated and the face jaw clutch members are separated by the action of Belleville spring 16. This aids in achieving rapid and effective disconnect when the fusible disc melts by overcoming the frictional resistance of the splines to axial movement, particularly at the high speeds at which the mechanism is operating.

In operation, the mechanism is assembled with the clutch in the engaged position by positioning fusible disc 20 between the bushing 21 and clutch member 5. Lock-nut 22 is then tightened to exert sufficient axial pressure on clutch member 5 through bushing 21 and the fusible washer to maintain the clutch members in engagement against the opposing axial force of spring 16. As long as the system is operating properly and there is no bearing malfunction, the clutch remains engaged and torque is transmitted from shaft 2 through hollow shaft 8 and clutch members 4 and 5 to driven shaft 3 and the generator. Whenever a bearing failure occurs friction arm 27 drops, coming into contact with the heat transmitting bushing 21. Arm 27 rubs against the upper surface of the bushing and at speeds of 10,000 rpm or above, this frictional engagement between the bushing and arm rapidly heats bushing 21. Since the bushing is in heat exchange relationship with fusible disc 20, the heat generated in bushing 21 is transmitted to disc 20 heating it rapidly towards its melting temperature. As soon as the melting temperature is reached, fusible disc 21 melts and the centrifugal force due to the rotating shafts rapidly throws the melted metal outwards establishing a clearance between hub 14 of clutch member 5 and bushing 21 so that the spring force exerted by Belleville spring 16 pushes clutch member 5 from right to left thereby disengaging the clutch members and disconnecting the driven shaft from the driving shaft.

When clutch members 4 and 5, which form part of the disconnect mechanism are separated upon melting of the fusible disc and the action of Belleville spring 16, torque is no longer transmitted from the driving and the driven shaft and the generator connected to shaft 3 comes to a stop as soon as the kinetic energy still retained by the shaft and generator is dissipated. Clutch member 4 hollow shaft 8 and driving shaft 2, which remain connected to the power or driving source, are free to rotate about ball bearing 18 and roller bearing 19. When the disconnect mechanism is disassembled for subsequent repair, a new fusible disc members substituted or alternatively the entire bushing and disc may be replaced and the disconnect mechanism reassembled. It will be apparent, that this combination of a fusible disc, and a heat generating mechanism responsive to a malfunction, produces a very rapid disconnect action since at the speed involved, sufficient heat will be generated to melt the disc very rapidly and disconnect the driving and driven shafts. Furthermore, the entire assembly may subsequently be reassembled by simply substituting a bushing and the fusible disc, which are simple and low cost elements. Furthermore, since the release element is a fusible element rather than a device which is to be physically ruptured or sheared, there is very little possibility of damage to the remaining portions of the assembly when the disconnect takes place.

Figure 2:
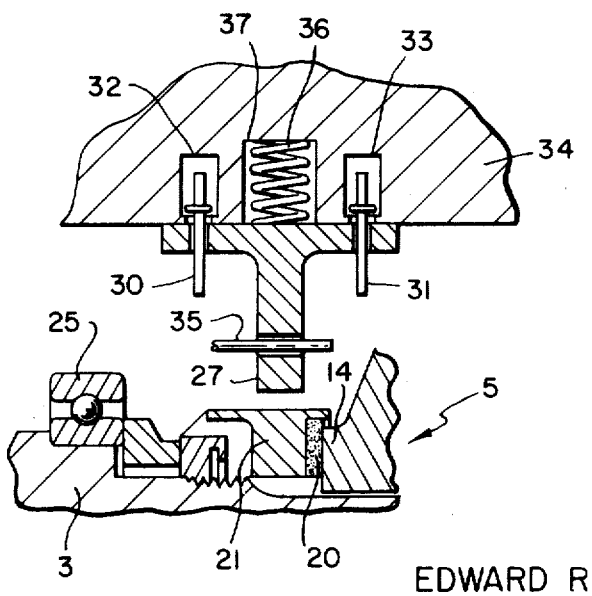
FIG. 2 is a fragmentary showing of an alternative embodiment of the disconnect mechanism.

In the embodiment of the disconnect mechanism illustrated in FIG. 1, an arrangement is shown in which the driving and driven shafts are disconnected upon the occurrence of a bearing failure. To this end, the friction arm which is actuated in response to the occurrence of the malfunction is shown as physically attached to the main generator bearing so as to bring it into physical contact with one of the elements of the disconnect mechanism. It will be obvious to those skilled in the art, that the invention is by no means limited to this particular arrangement or to an arrangement in which the driving and driven shafts are disconnected in response to a bearing failure. The assembly can also be utilized to disconnect the shaft in response to any other malfunction in the system such as vibration, high temperature, etc. Furthermore, the friction arm which initiates the disconnect sequence, need not be physically connected to the element in the system being monitored. The arrangement can easily be modified so that the disconnect is actuated in response to an electrical control signal, either directly from the sensors placed throughout the vehicle to sense one of the malfunctions, or through the intervention of the pilot whenever he receives an indication of a malfunction from one of the sensors. FIG. 2 illustrates such an alternative embodiment in which the disconnect mechanism is remotely controlled, either from the pilot's panel, or directly from one of the sensing mechanisms. In order to simplify the description of the arrangement of FIG. 2, the same numerals are utilized to identify components corresponding to those illustrated in FIG. 1. In FIG. 2, internally splined hub 14 of clutch member 5 engages splines 15 on driven shaft 3 and bears against a fusible disc 20 supported between hub 14 and thermally conductive bushing 21. The threaded lock-nut 22 mounted on shaft 3 bears against bushing 21 and forces the fusible disc against the hub of the clutch member to exert sufficient axial force to maintain the clutch in the engaged condition against the action of the clutch spring, not shown. Friction arm 27 is T-shaped and is supported by a pair of guide pins 30 and 31 extending through passages in the arm and into suitable bores 32 and 33 in a support housing 34. The guide pins constrain movement of the friction arm in the vertical direction to permit the friction arm to come into contact with heat transmitting bushing 21. Friction arm 27 is normally maintained out of contact with the bushing 21 by latch mechanism such as a latch pin 35 which extends through a suitable operning in the lower portion of the friction arm. A compression coil spring 36 mounted in a counter bore 37 in the housing bears against the friction arm and spring biases it against a latch pin 35 to produce vertical movement of the friction arm towards the bushing whenever latch pin 35 is disengaged. Latch pin 35 may be controlled by any suitable actuating means not shown, such as a solenoid, manual release or the like to release the friction arm. Removal of the latch pin, as pointed out above, produces axial movement of the ring to engage the upper surface of the heat transmitting bushing 23 to initiate the disconnect sequence. The solenoid control mechanism for latch pin 35 may, also pointed out above, be controlled directly from the electrical signal generated by sensors positioned within the vehicles so that the disconnect mechanism is automatic whenever a malfunction occurs within the vehicle. Alternately, the solenoid may be controlled by means of a switch or the like from the pilot's panel whenever the indicating system on the pilot's panel indicates a malfunction which requires disconnection of the generator from the guiding source.

From the foregoing description, it can be readily appreciated that a simple, rapid, and effective non-resettable disconnect mechanism for a generator, and particularly, for an aircraft generator, has been provided which is capable of disconnecting the generator from the driving source rapidly and efficiently at high speeds to prevent damage to the system, while at the same time, providing an arrangement which may be easily reassembled with minimal substitution of components to place the disconnect assembly back into operation.

While a non-resettable disconnect mechanism has been described in what is presently considered to be a preferred embodiment of the invention, it will be apparent to those skilled in the art that various changes and modifications may be made in the structure and in the instrumentalities utilized without departing from the spirit and scope of the invention.

What is claimed as new and desired to be secured by Letters Patent in the United States is:

1. A non-resettable disconnect device for releasably connecting driving and driven shafts including:
   a. a spring loaded clutch means having
      1. a pair of mating clutch members coupled respectively to the driving and driven shafts and
      2. spring means positioned between said clutch member for separating said clutch members
   b. means for releasably maintaining said clutch in engagement for transmission of torque from the driving to the driven shaft including a fusible means positioned to exert force on one of said clutch members to maintain the clutch in engagement against the action of said spring means, and
   c. means to disconnect the driving and driven shaft in response to a malfunction by disengaging said clutch including means to generate heat and melt said fusible means in response to said malfunction to remove the force exerted against said clutch member and provide sufficient clearance to permit separation of the clutch members by the force exerted by the spring means.

2. The disconnect device according to claim 1 wherein said clutch means comprises a toothed face clutch.

3. The disconnect device according to claim 1 wherein said means to generate heat and melt said fusible means includes generating friction means actuated in response to a malfunction.

4. The disconnect device according to claim 1 wherein said means to maintain the clutch in engagement includes a fusible disc, a heat conducting element in contact with said disc and a friction member positioned adjacent to the heat conducting member and which is brought into rubbing contact therewith in response to a malfunction to generate heat, whereby the heat generated melts the disc to permit disengagement of the clutch members by the force exerted by the spring member.

5. The disconnect device according to claim 4 in which said fusible disc is made of tin.

6. The disconnect device according to claim 4 wherein said friction member is positioned to be out of contact with said heat conducting member, latching means to restrain said friction member and means to release said latching member in response to a malfunction to bring said member into rubbing contact with said heat conducting member.

7. The disconnect device according to claim 2 including a hollow coupling shaft surrounding the driving shaft and fastened to said driving shaft at one end, a flange portion at the other end of said coupling shaft, means to fasten one of said clutch members to said flange portion, a splined hub on the other clutch member for mounting the other clutch member on and engaging the driven shaft, fusible disc means surrounding said shaft and positioned against the hub to maintain the clutch engaged under normal conditions.

8. The disconnect device according to claim 7 wherein each of said clutch members includes a plurality of mating, angled teeth positioned circumferentially around the clutch.

* * * * *